July 25, 1933.   G. S. ROWELL   1,919,481
PHOTOGRAPHIC SCREEN
Filed Oct. 3, 1931
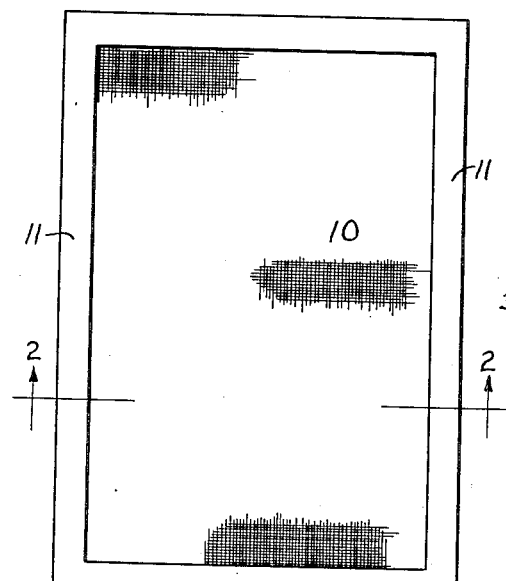
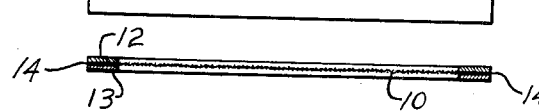
FIG 2
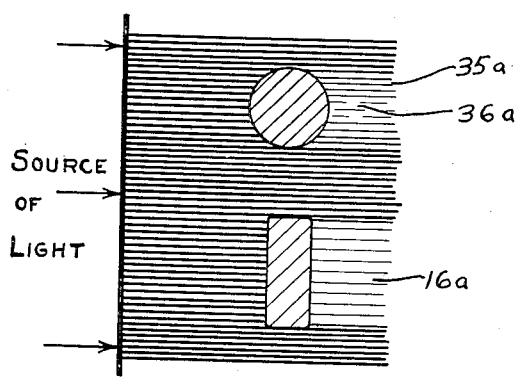
FIG 6
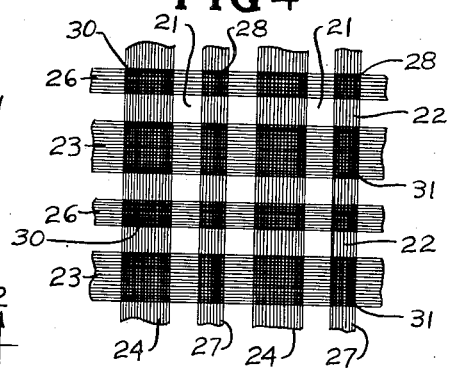
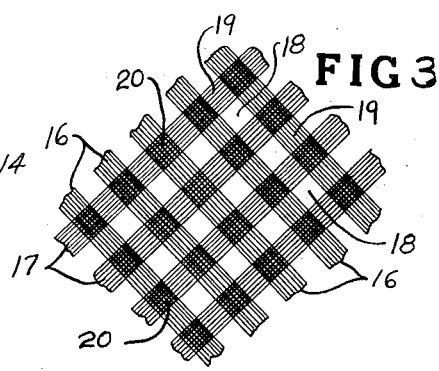
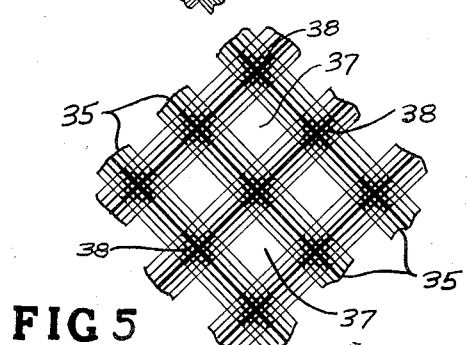
FIG 5
Inventor
George S. Rowell,
By Baker, Golrick & Tear
Attorneys.

Patented July 25, 1933

1,919,481

UNITED STATES PATENT OFFICE

GEORGE S. ROWELL, OF CLEVELAND, OHIO, ASSIGNOR TO MULTIGRAPH COMPANY, OF WILMINGTON, DELAWARE, A CORPORATION OF DELAWARE

PHOTOGRAPHIC SCREEN

Application filed October 3, 1931. Serial No. 566,640.

This invention relates to photographic screens and more particularly to screens such as are used in connection with photolithographic printing processes.

It is well known that in order to reproduce fine gradations in tone by a printing process, such as photolithography, it is customary to break up the printing areas into minute dots or squares, this breaking up being accomplished by means of a screen, which produces a pattern of light and dark lines and dots in the light falling on the sensitive surface of the printing plate. At the present time such screens comprise closely ruled cross lines or other patterns imposed on a sheet of glass, usually by means of a photographic process. The surface of the glass bearing the pattern is then covered by another sheet of glass, the two being cemented together to protect the lines or the pattern. Such screens are expensive to manufacture, are fragile, and because of the differences in the thickness of the glass each screen must be often focused individually in the camera by visual focusing, an operation which requires a high degree of skill and also complicates the camera mechanism.

Furthermore, as the dark portions of present screens are perfectly opaque throughout, the dots or other screen patterns have sharply defined edges, and to obtain a graduated dot or a pattern with shaded edges, it is necessary to throw the screen out of focus. Also, with present screens it is difficult to obtain the correct reproduction of intermediate tones, fine shading, etc., and in color work it is necessary to employ color filters in conjunction with the screen to obtain suitable printing plates.

The principal objects of my invention are to provide a screen by means of which correct reproductions of all of the tones of the original can be obtained and with which a shaded or graduated screen effect can be obtained without throwing the screen out of focus.

Another object is to provide a screen which will also act as a color filter. Further objects are to provide a light, thin screen which may be easily and cheaply manufactured and which cannot be easily broken, and to provide screens of uniform thickness so that the screens can be accurately positioned in the camera by a previously adjusted holder, thus eliminating visual focusing.

Briefly, my screen comprises a supporting frame, which is adapted to support a nonmetallic open mesh fabric, any one of several types of fabric being employed to obtain the desired screen pattern on the plate.

Referring to the drawing, Fig. 1 is a plan view of a screen made according to my invention; Fig. 2 is a section along the line 2—2 of Fig. 1; Figs. 3, 4 and 5 are greatly enlarged diagrammatic views showing the appearance of various forms of screen fabrics, as viewed by transmitted light; and Fig. 6 is a greatly enlarged diagrammatic view, showing the transmission of light by various types of threads or filaments which may be employed in the fabric.

As shown in Fig. 1, the screen material indicated generally at 10 may be supported by a metal frame 11. As shown in Fig. 2, the frame 11 may comprise two similar hollow rectangular members 12 and 13. In producing the frame the fabric may be stretched across the opening of the member 13, for example, and cemented thereto. Another layer of cement is applied to the fabric and the member 12 laid down on the fabric and thereafter the members 12 and 13 are secured together, as by soldering the edges 14. I have found that a satisfactory material for constructing the frame is brass, of about $\frac{1}{32}$nd inch thickness.

The fabric is preferably woven of translucent material, which may be in the form of threads, or of filaments of a cellulose material which may be extruded in the desired size and shape. In the modification shown in Fig. 3 of the drawing, the fabric is woven of ribbon-like filaments or threads, the material being translucent, and the intersecting strands 16 and 17 being substantially identical. The light shining through a screen composed of such fabric will be unaffected in the openings 18, between the respective strands, thus producing the same effect as white light on the plate. In the portions 19, where a single thickness of the material is interposed between the light and the plate, the intensity of the light is substantially decreased, and in the portions 20, at the intersections of the respective strands or filaments, the screen is substantially opaque. In this view, and in Figs. 4 and 5, the shade lines are employed to diagrammatically show the transmission of light by the screens.

In Fig. 4, filaments similar to those employed in modification shown in Fig. 3, are used, but alternate filaments vary in size, thus producing dots of different sizes and shapes. Here again, in the vacant spaces the light is unaffected, as at 21. The intensity of the light is reduced in the spaces where there is a single thickness of material, as at 22, and dark dots are produced at the intersections. When this type of material is employed, dots of various shapes and sizes are obtained. Thus, at the intersection of the large filaments 23 and 24 relatively large squares 25 are obtained. At the intersection of the small filaments, 26 and 27, relatively small squares 28 result, while at the intersection of the large filaments 24 and the small filaments 26 rectangles 30, extending in a horizontal direction, and at the intersection of the large filaments 23 with the small filaments 27 rectangles 31, extending in a vertical direction, are obtained. Thus, it will be seen that screens made according to this modification will produce a pattern in which the dark, intermediate and light areas are of different sizes and shapes.

In Fig. 5 I have shown a form of fabric in which substantially cylindrical threads or filaments are employed. As indicated in Fig. 6, the light shining through the translucent filaments 35a is slightly diminished in intensity at the edges of the filaments, and gradually the light intensity is decreased until at the center, as indicated at 36a, a very small amount of light will be transmitted, whereas the flat, ribbon-like strand 16a transmits substantially the same amount of light throughout its entire width. Thus, when screens formed from round strands are employed, the screen image will vary from perfectly light to perfectly black by fine gradations in tone. No light is intercepted at the open spaces 37, whereas, in the center of the intersections, as at 38, practically all of the light is intercepted. Where there is only a single thickness of filament the light varies gradually from full intensity at the edges of the filament to very greatly diminished intensity at the center thereof. Such a screen will obviously produce a soft effect, preserving all of the fine gradations of tone of the original, and destroying the visability of the screen effect.

Ordinarily, I prefer to make the threads or filaments out of a material having a neutral or gray tint, which will not affect the color values of the original. However, in some cases, it is desirable to emphasize certain colors and to restrain others. This may very easily be done by dyeing the threads or filaments in the desired color. For example, by employing a translucent yellow screen the amount of blue light transmitted will be cut down and the colors at the red end of the spectrum will be emphasized. By selecting the proper colors and the proper emulsion, such as a panchromatic or orthochromatic emulsion, it is possible to accentuate any desired color as distinct from the remaining colors in the photographic copy. This feature is also valuable in bringing out correct tonal values in making monochrome reproductions of colored objects, as well as in accentuating certain colors.

It is well known that blue rays have the highest actinic value and photograph as white, whereas red objects will photograph as practically black, with an ordinary film. By holding back the action of the blue rays by means of a yellow screen and giving a slightly longer exposure, the red can be made to appear a proper tone of gray and the blue will be slightly dark, rather than a dead white, thus producing a monochrome reproduction in which the various colors will be reproduced in correct tones of gray.

From the foregoing description of a preferred form of my invention, it will be seen that I have provided a photographic screen well adapted for use in connection with photolithography or other photo-mechanical printing processes. My screen can be easily manufactured and is practically indestructible; it is light; requires no cleaning, other than perhaps an occasional dusting of the surface; and as it is supported in a metal frame, it can be positioned accurately within a camera, without the necessity of visual focusing of each individual screen; and because of the character of the fabric employed in the screen, a highly desirable range of tone, varying from white to black and including all intermediate shades of gray, can be obtained. Furthermore, desired color corrections can be made in the screening operations.

Various changes and modifications of the invention from those shown in the drawing will be apparent to one skilled in the art. The drawing and the foregoing specification are intended to describe preferred forms of the invention only, and are not to be considered as limiting the invention, which is defined by the appended claims.

I claim:

1. A photographic screen comprising intersecting sets of translucent strands, the said sets being spaced apart to provide an open mesh fabric, and a supporting frame for said fabric.

2. A photographic screen comprising a fabric formed of ribbon-like flat filaments of translucent material woven to form an open mesh, whereby the screen will produce an image on a photographic plate consisting of minute dark, intermediate and light portions.

3. A photographic screen comprising an open mesh fabric formed of intersecting sets of substantially parallel strands, individual strands being of translucent material and of substantially circular cross section, whereby the transmission of light by the screen will vary from substantially 100 percent in the open mesh spaces to practically zero at the center of the intersections of the respective strands by gradual changes in light transmission.

4. A photographic screen comprising an open mesh fabric formed of translucent intersecting groups of strands of different sizes.

5. A photographic screen comprising an open mesh fabric formed of translucent intersecting ribbon-like strands.

6. A photographic screen comprising a fabric formed of filaments of translucent material grouped into sets which are woven to leave periodic open spaces between the sets, said strands extending substantially at right angles to each other.

7. A photographic screen comprising an open mesh fabric formed by intersecting sets of substantially parallel translucent strands, the sets of strands comprising alternate relatively narrow and relatively wide strands of translucent material, the space between the sets being greater than the space between strands in a set, whereby the screen will produce a pattern of dark, intermediate and light portions of different shapes and sizes.

8. A photographic screen comprising an open mesh fabric formed of translucent intersecting strands, whereby three grades of transmissibility are provided, namely, the open regions, the regions at the crossings, and the strand regions between crossings.

9. A photographic screen comprising an open mesh fabric formed of translucent intersecting substantially cylindrical strands with the open spaces having materially greater width than the diameter of the strands.

GEORGE S. ROWELL.